United States Patent
Lu et al.

(10) Patent No.: US 7,536,749 B2
(45) Date of Patent: May 26, 2009

(54) HINGE ASSEMBLY HAVING LIMITING AND POSITIONING ABILITIES

(75) Inventors: Sheng-Nan Lu, Shulin (TW); Hsiang-Chi Chien, Shulin (TW); Chia-Hsiang Chen, Shulin (TW)

(73) Assignee: Shin Zu Shing Co., Ltd., Shulin, Taipei Hsien (TW)

( * ) Notice: Subject to any disclaimer, the term of this patent is extended or adjusted under 35 U.S.C. 154(b) by 454 days.

(21) Appl. No.: 11/399,832

(22) Filed: Apr. 6, 2006

(65) Prior Publication Data

US 2007/0039134 A1 Feb. 22, 2007

(30) Foreign Application Priority Data

Aug. 17, 2005 (TW) .............. 94214067 U

(51) Int. Cl.
*E05D 11/10* (2006.01)
(52) U.S. Cl. .......................................... 16/330; 16/340
(58) Field of Classification Search ........... 16/337–339, 16/342, 330, 303, 374, 376, 377, 340; 361/680–683, 361/814; 455/90.3, 575.1, 575.3, 575.8; 379/433.12, 433.13; 348/373, 333.01, 333.06, 348/794
See application file for complete search history.

(56) References Cited

U.S. PATENT DOCUMENTS

| | | | | |
|---|---|---|---|---|
| 5,178,481 A | * | 1/1993 | Kawamura | 403/92 |
| 5,996,178 A | * | 12/1999 | Murray | 16/303 |
| 6,125,509 A | * | 10/2000 | Hartigan et al. | 16/337 |
| 6,148,480 A | * | 11/2000 | Cooke | 16/303 |
| 6,862,779 B1 | * | 3/2005 | Lu et al. | 16/340 |
| 2004/0093690 A1 | * | 5/2004 | Lu et al. | 16/330 |
| 2004/0177477 A1 | * | 9/2004 | Hsieh | 16/303 |
| 2004/0181909 A1 | * | 9/2004 | Kawamoto | 16/330 |
| 2005/0278895 A1 | * | 12/2005 | Su | 16/340 |
| 2006/0064850 A1 | * | 3/2006 | Sato et al. | 16/330 |
| 2007/0011848 A1 | * | 1/2007 | Lu et al. | 16/340 |
| 2007/0136992 A1 | * | 6/2007 | Lu et al. | 16/330 |

* cited by examiner

*Primary Examiner*—Chuck Y. Mah
(74) *Attorney, Agent, or Firm*—patenttm.us

(57) ABSTRACT

A hinge includes a first sleeve and a second sleeve pivotally engaged with the first sleeve. The first sleeve has an arcuate step formed on an outer surface thereof, a neck extending from an outer surface of the arcuate step, at least one indentation formed on the arcuate step and a first upright wall formed on an end of the indentation. The second sleeve has at least one projection formed on an inner surface thereof to correspond to and be selectively received in the at least one indentation of the first sleeve so as to provide a positioning effect to the second sleeve when the at least one projection is received in the at least one indentation and a second upright wall formed on an end of the projection of the second sleeve to correspond to the first upright wall such that the first upright wall abutting the second upright wall is able to prevent excessive pivotal movement of the second sleeve relative to the first sleeve.

5 Claims, 6 Drawing Sheets

HINGE ASSEMBLY HAVING LIMITING AND POSITIONING ABILITIES

BACKGROUND OF THE INVENTION

1. Field of the Invention

The present invention relates to a hinge assembly, and more particularly to a hinge assembly having limiting and positioning abilities to avoid damage to appliances connected to the hinge assembly.

2. Description of the Prior Art

As well known in the art, a hinge is provided between two objects so as to provide a pivotal relationship between the two objects. Examples can be seen everywhere in daily lives. A common example is the display and the base of a computer, wherein the display pivots about a central axis of the hinge so that various observation angles are provided to different operators. In order to protect the display from damage resulted from excessive pivotal movement of the display relative to the base of the computer, the pivotal angle of the display is limited within a certain range. That is, the pivotal movement of the display is stopped when the display is pivoted to a critical angle. However, when the display is pivoted toward the base to the critical angle relative to the base, if the operator continues to apply a force to the display, eventually the display is damaged.

To overcome the shortcomings, the present invention tends to provide an improved hinge assembly to mitigate the aforementioned problems.

SUMMARY OF THE INVENTION

The primary objective of the present invention is to provide a hinge assembly having limiting and positioning abilities.

In order to accomplish the aforementioned objective, the hinge assembly of the present invention includes a first sleeve and a second sleeve pivotable relative to the first sleeve. The first sleeve has multiple indentations defined in an outer surface thereof and a first upright wall formed adjacent to an end of one indentation. The second sleeve has multiple projections formed on the inner surface of the second sleeve corresponding to the indentations and a second upright wall formed on the end of one projection corresponding to and abut to the first upright wall of the first sleeve.

Another objective of the present invention is that the second sleeve is pivotally engaged with the first sleeve such that the when the screen of a laptop computer is engaged with a base of the laptop computer, engagement between side walls defining the first upright wall and the second upright wall causes an additional force to be applied to the screen, the screen will not move further toward the base, which protects the screen from damage caused by the screen rubbing against the base.

A further objective of the present invention is that while the second sleeve is pivotal relative to the first sleeve, the projections of the second sleeve received in the indentations of the first sleeve result in provision of positioning effect to the screen relative to the base.

Other objects, advantages and novel features of the invention will become more apparent from the following detailed description when taken in conjunction with the accompanying drawings.

DETAILED DESCRIPTION OF THE PREFERRED EMBODIMENT

Figure 1:
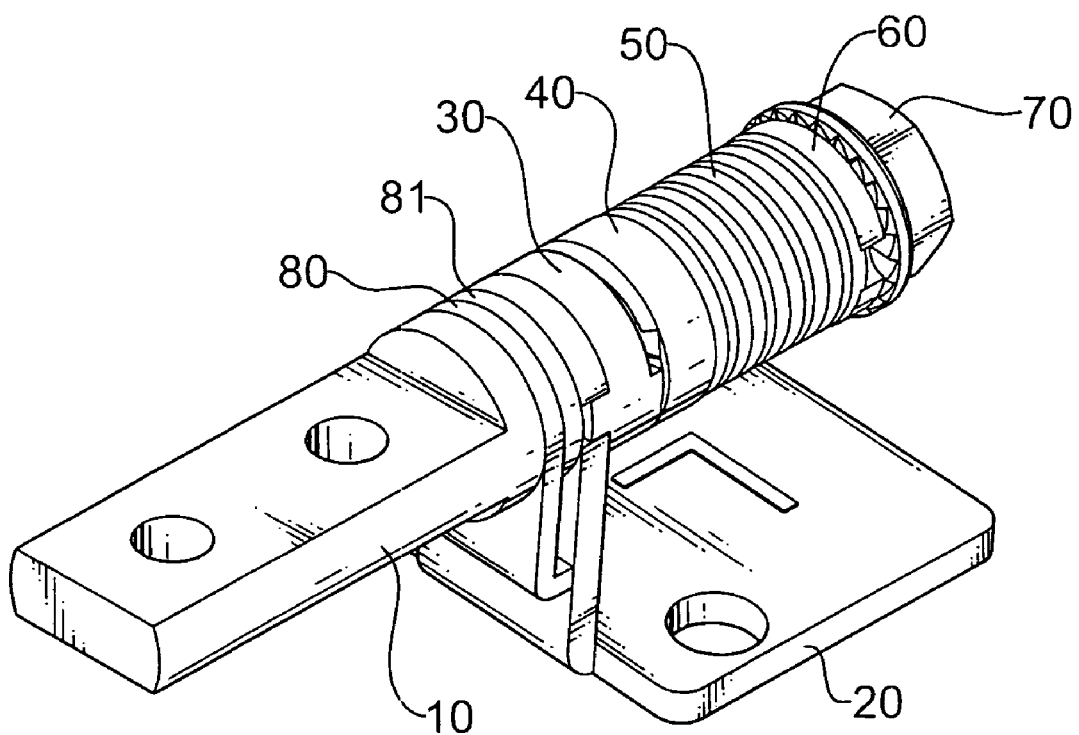
FIG. 1 is a perspective view of the hinge of the present invention.
Figure 2:
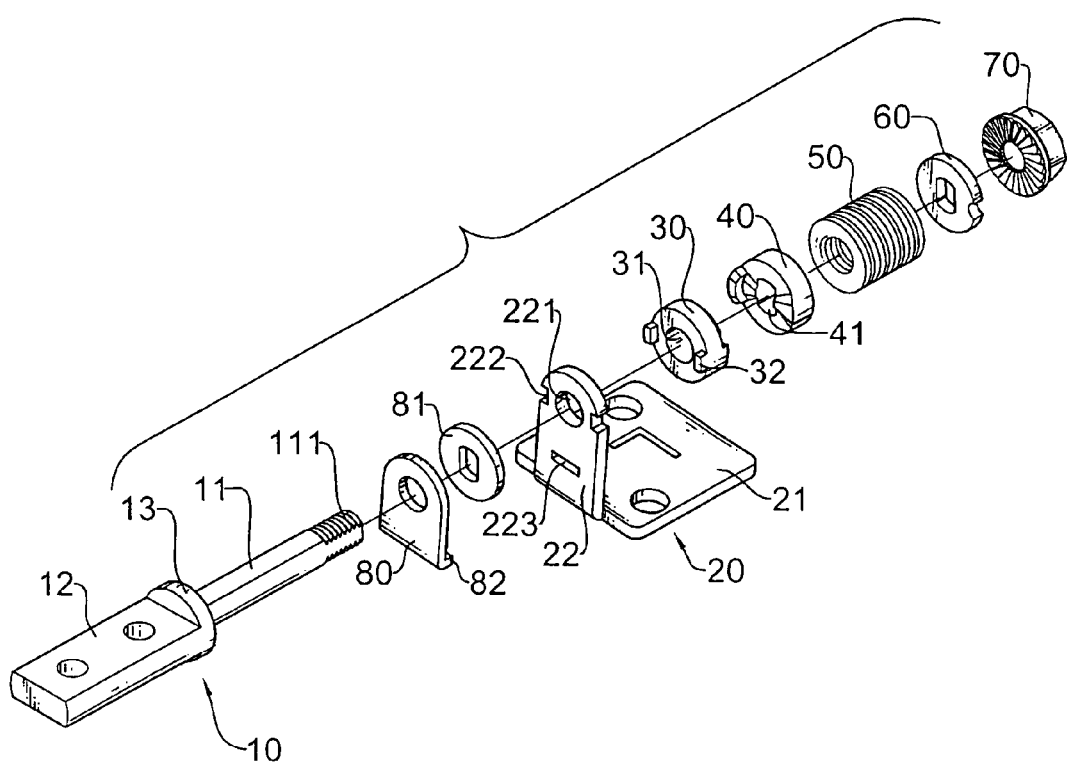
FIG. 2 is an exploded perspective view of the hinge in FIG. 1.

With reference to FIGS. 1 and 2, it is noted that the hinge in accordance with the present invention includes a shank (10), a bracket (20), a first sleeve (30), a second sleeve (40), a resilient member (50), a first washer (60), a securing member (70), a second washer (80) and a pad (81).

The shank (10) is composed of an extending portion (11) and an engagement portion (12). The extending portion (11) has a threading (111) formed on a free end thereof and the engagement portion (12) is adapted to connect to a screen of a laptop computer (not shown). A crown (13) is formed and sandwiched between the extending portion (11) and the engagement portion (12).

The bracket (20) is mounted rotatably around the shank (10) and is composed of a bottom (21) and an upright wall (22) vertically extending from a side face of the bottom (21). The bottom (21) is adapted to connect to a base of a laptop computer (not shown) and the upright wall (22) has a first through hole (221) defined through the upright wall (22), two notches (222) each defined in a side face of the upright wall (22) to be opposite to each other and a fixing hole (223) defined in the upright wall (22).

The first sleeve (30) is attached securely to the bracket (20), is mounted rotatably around the shank (10) and has a second through hole (31) defined to correspond to and communicate with the first through hole (221) of the upright wall (22) and two bosses (32) each formed on an outer periphery of two opposed sides of the first sleeve (30) to correspond to and be received in the two notches (222) of the upright wall (22) of the bracket (20).

Figure 3:
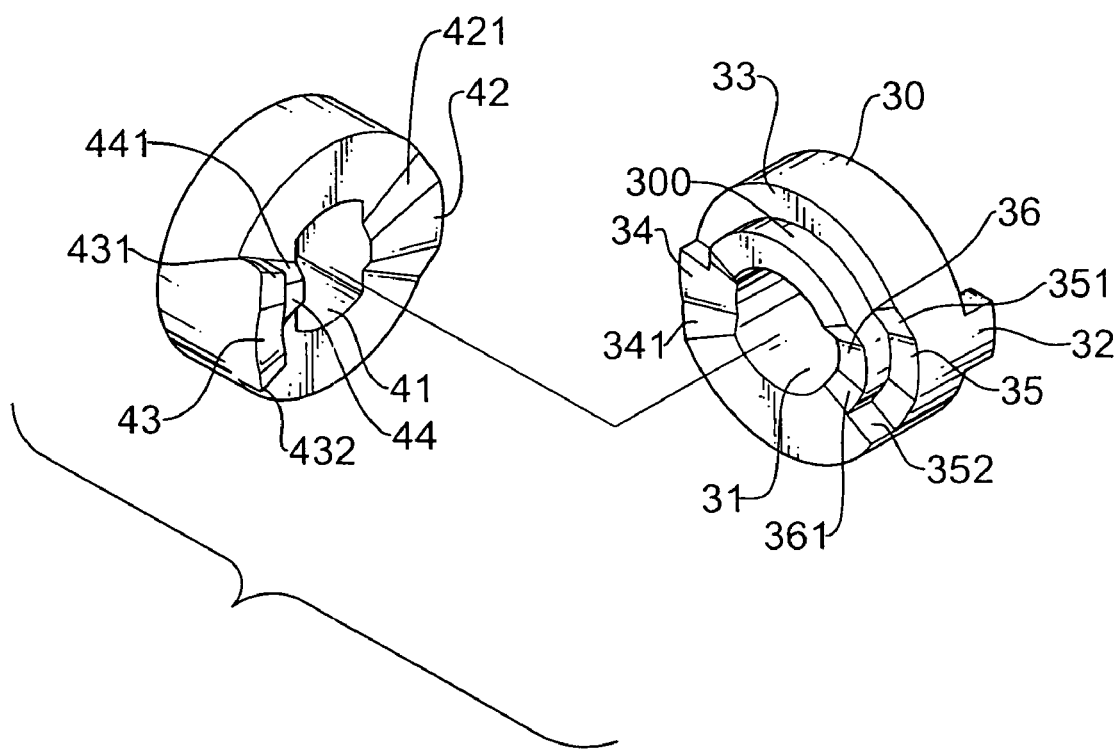
FIG. 3 is a perspective view showing the first sleeve and the second sleeve.

With reference further to FIG. 3, it is observed that the first sleeve (30) still includes an arcuate step (33) formed on an outer surface thereof, a first indentation (34) formed on an outer surface of a neck (300) which extends from an outer surface of the step (33) adjacent to an inside annular edge of the step (33), a second indentation (35) defined in the outer surface of the step (33) adjacent to an outside annular edge of the step (33) and a third indentation (36) defined in the outer surface of the neck (300) opposite to the first indentation (34). Two first arcuate faces (341) are formed respectively on two ends of the first indentation (34). Two third arcuate faces (361) are formed respectively on two ends of the third indentation (36). A second arcuate face (351) and a first upright wall (352) are respectively formed adjacent to the second indentation (35). Furthermore, the second sleeve (40) is mounted securely around the shank (10) and includes a hole (41) having a configuration corresponding to a shape of the extending portion (11) of the shank (10), a first projection (42) corresponding to the first indentation (34) and extending from an inner surface thereof with two first arcuate faces (421) formed respectively on two ends of the first projection (42), a second projection (43) corresponding to the second indentation (35) and extending from the inner surface thereof with a second arcuate face (431) and a second upright wall (432) formed respectively on two ends of the second projection (43) and a third projection (44) opposite to the first projection (42) and corresponding to the third indentation (36) and having a height the same as that of the first projection (42). Two third arcuate faces (441) are formed respectively on two ends of the third projection (44). It is noted that the second projection (43) has a height the same as a depth of the arcuate step (33) such that the second projection (43) is slidably engaged with the periphery defining the arcuate step (33) and receivable in the corresponding indentation (35) of the first sleeve (30).

The resilient member (50) is mounted around the extending portion (11) of the shank (10) to provide recovery force to the hinge after the hinge is pivoted. The first washer (60), the second washer (80) and the pad (81) are all mounted around the extending portion (11) of the shank (10) and the securing member (70) is threadingly mounted around the extending portion (11) to secure the combination of the hinge of the present invention.

It is noted that when the hinge is assembled, the first sleeve (30) is mounted on the bracket (20) with the two bosses (32) received in the two corresponding notches (222) of the upright wall (22) of the bracket (20). The hole (41) is so configured that after the extending portion (11) extends through the hole (41), there is no relative movement between the shank (10) and the second sleeve (40). That is, the hole (41) is configured to have a shape corresponding to that of the extending portion (11) such that after the extending portion (11) extends through the hole (41), the second sleeve (40) is securely mounted around the extending portion (11) of the shank (10).

Because the focus of the present invention lies on the structure and function of the first sleeve (30) and the second sleeve (40), the mounting of the resilient member (50), the first washer (60), the second washer (80), the pad (81) and the securing member (70) is omitted for clarity and to avoid confusion.

Figure 4:
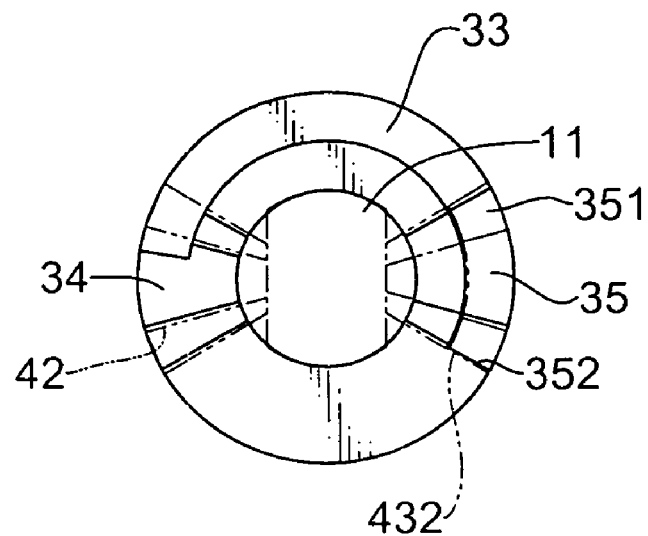
FIG. 4 is a schematic side plan view showing a first upright wall of the first sleeve is abutting a second upright wall of the second sleeve.
Figure 5:
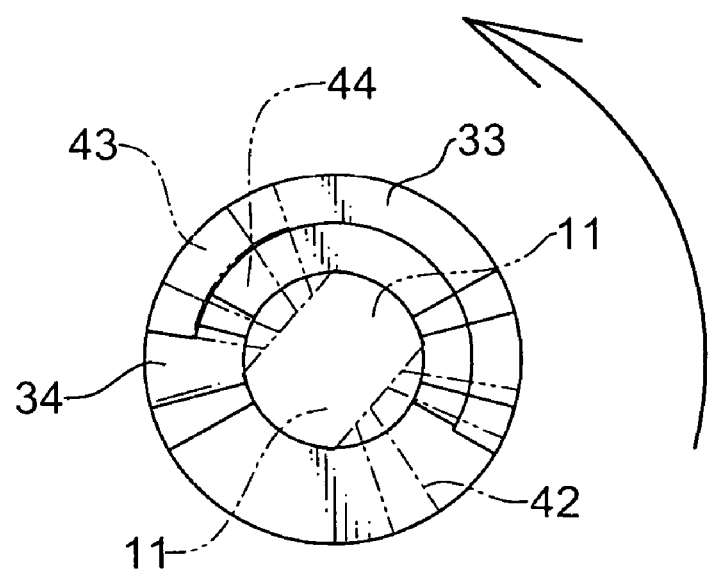
FIG. 5 is an operational view showing that the second sleeve is pivotal relative to the first sleeve.
Figure 6:
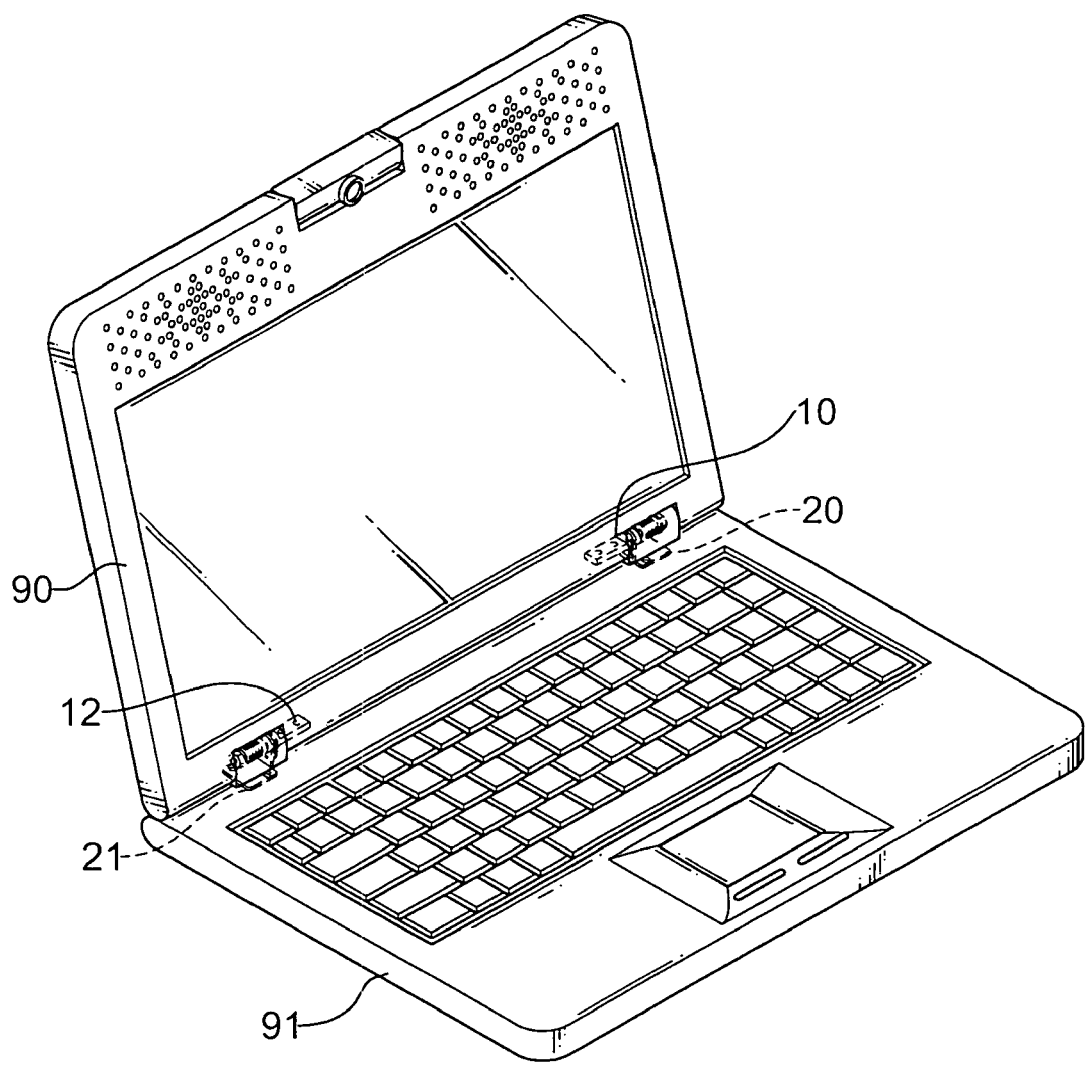
FIG. 6 is a perspective view showing that the hinge of the present invention is applied to attach to the screen and the base of a laptop computer respectively.

With reference to FIGS. 4, 5 and 6, the engagement portion (12) of the shank (10) is securely connected to the screen (90) of the laptop computer and the bottom (21) of the bracket (20) is securely connected to the base (91) of the laptop computer, when the screen (90) is pivoted relative to the base (91), the first projection (42) and the third projection (44) slide on the neck (300) to be selectively received in the corresponding first indentation (34) and the third indentation (36). Further, the second projection (43) slides on the arcuate step (33) and is selectively received in the second indentation (35). When the first projection, (42), the second projection (43) and the third projection (44) are actually received in the corresponding first indentation (34), the second indentation (35) and the third indentation (36), a positioning effect is provided to the screen (90) to hold the screen (90) in position relative to the base (91) so that the user of the laptop computer is able to watch the screen (90) at an angle required.

When the screen (90) is pivoted toward the base (91) and engaged with the base (91) at a time when the laptop computer is no longer being used, the first upright wall (352) abuts the second upright wall (432) to stop further pivotal movement of the screen (90) toward the base (91). Therefore, damage to the screen (90) resulted from the screen (90) rubbing the base (91) is avoided due to mutual abutment between the two walls respectively defining the first upright wall (352) and the second upright wall (432), the pivotal movement of the screen (of the second sleeve (40)) relative to the base (91) (to the first sleeve (30)) is stopped.

From the above description, it is noted that the incorporation of the indentations and the projections provides a positioning effect to the hinge of the present invention when the screen is pivoted relative to the base. However, when the screen is closed to have the screen engaged with the base, the engagement between the walls defining the first right angle and the second right angle, respectively, stops further pivotal movement of the screen so that damage to the screen is avoided.

Figure 7:
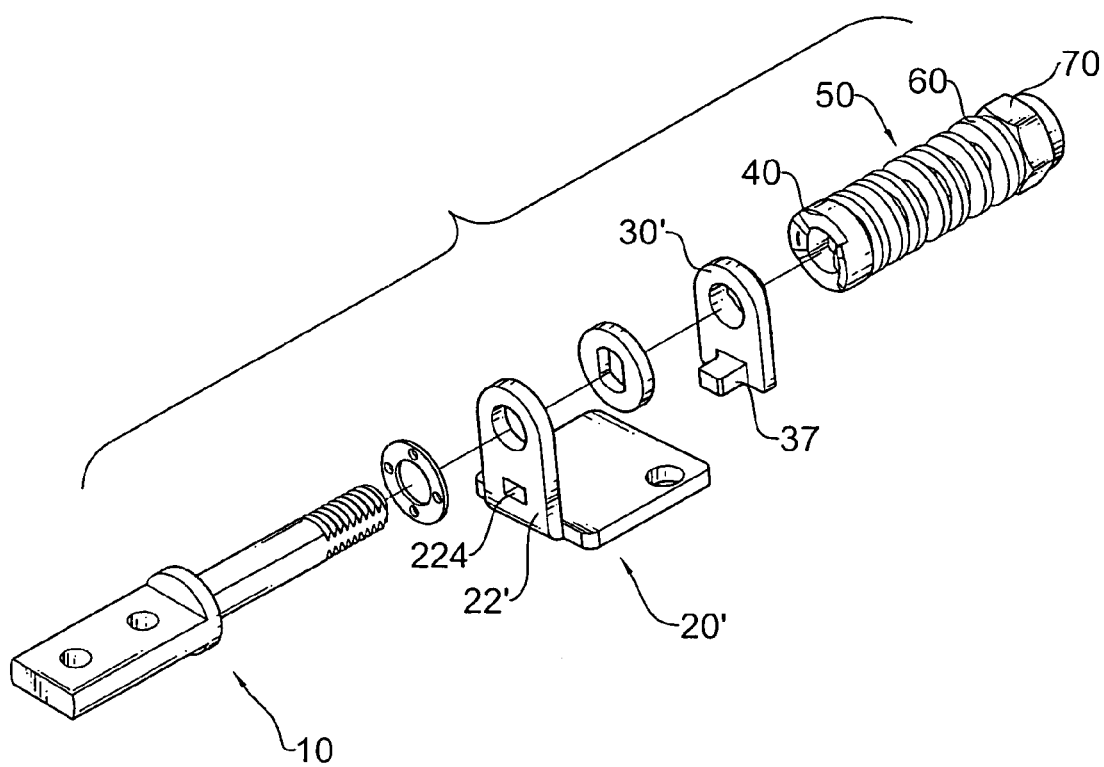
FIG. 7 is an exploded perspective view of a second embodiment of the hinge of the present invention.

With reference to FIG. 7, it is noted that the first sleeve (30') may have an extension (37) extending from a side face of the first sleeve (30') to correspond to and extending through the fixing hole (223) of the bracket (20) so that the first sleeve (30') is immovable relative to the bracket (20).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. In a hinge having a bracket, a shank having an engagement portion adapted to securely engage with a screen of a laptop computer and an extending portion extending from a free end of the engagement portion and through the bracket, a first sleeve mounted rotatably around the shank and securely engaged with the bracket and a second sleeve mounted securely around the shank and pivotally engaged with the first sleeve, wherein the first sleeve has an arcuate step formed on an outer surface thereof, a neck extending from an outer surface of the arcuate step, at least one indentation formed on the outer surface of the arcuate step and a first upright wall formed adjacent to an end of one indentation; and the second sleeve has at least one projection formed on an inner surface thereof and corresponding to and being selectively received in the at least one indentation of the first sleeve so as to provide a positioning effect to the second sleeve when the at least one projection is received in the at least one indentation and a second upright wall formed adjacent to an end of one projection of the second sleeve and corresponding to the first upright wall such that the first upright wall abutting the second upright wall is able to prevent excessive pivotal movement of the second sleeve relative to the first sleeve.

2. The hinge as claimed in claim 1, wherein the at least one indentation includes a first indentation in an outer surface of the neck of the first sleeve and a second indentation formed in the outer surface of the first sleeve to be opposite to the first indentation.

3. The hinge as claimed in claim 2, wherein the at least one projection includes a first projection formed on the inner surface of the second sleeve and a second projection also formed on the inner surface of the second sleeve so that the first projection and the second projection slide on the arcuate step of the first sleeve and the first projection and the second projection of the second sleeve are able to be selectively received in the first indentation and the second indentation of the first sleeve.

4. The hinge as claimed in claim 3, wherein the first sleeve further has a third indentation defined in an outer surface of the arcuate step, the second sleeve further has a third projection formed on the inner surface of the second sleeve, the first upright wall is formed adjacent to an end of the third indentation, and the second upright wall is formed on an end of the third projection.

5. The hinge as claimed in claim 4, wherein the first sleeve has two first arcuate faces formed respectively adjacent to two ends of the first indentation, two second arcuate faces formed respectively adjacent to two ends of the second indentation and a third arcuate face formed on the other end of the third indentation, the second sleeve has two first arcuate faces formed respectively adjacent to two ends of the first projection, two second arcuate faces formed respectively adjacent to two ends of the second projection to the peripheral edge of the second sleeve and a third arcuate face formed adjacent to the other end of the third projection.

\* \* \* \* \*